US010619898B2

(12) United States Patent
Hollander et al.

(10) Patent No.: US 10,619,898 B2
(45) Date of Patent: Apr. 14, 2020

(54) WATER RECIRCULATION SYSTEM

(71) Applicant: Baltimore Aircoil Company, Inc., Jessup, MD (US)

(72) Inventors: Philip Hollander, Silver Spring, MD (US); Gregory Martell, Baltimore, MD (US); Wim Uytterhoeven, Lier (BE); Thomas Van Dijck, Lier (BE); David Andrew Aaron, Reisterstown, MD (US)

(73) Assignee: BALTIMORE AIRCOIL COMPANY, INC., Jessup, MD (US)

( * ) Notice: Subject to any disclaimer, the term of this patent is extended or adjusted under 35 U.S.C. 154(b) by 181 days.

(21) Appl. No.: 15/888,938

(22) Filed: Feb. 5, 2018

(65) Prior Publication Data
US 2018/0224174 A1 Aug. 9, 2018

Related U.S. Application Data

(60) Provisional application No. 62/456,873, filed on Feb. 9, 2017.

(51) Int. Cl.
*F25B 41/04* (2006.01)
*F25B 49/02* (2006.01)
(Continued)

(52) U.S. Cl.
CPC .......... *F25B 41/046* (2013.01); *F24F 1/0007* (2013.01); *F24F 5/0035* (2013.01);
(Continued)

(58) Field of Classification Search
CPC ........ F25B 41/046; F25B 49/02; F25B 19/04; F25B 11/526; F28B 5/00; F28B 9/04;
(Continued)

(56) References Cited

U.S. PATENT DOCUMENTS 5,069,043 A * 12/1991 Wachs, III .............. F25B 40/02
62/280
5,121,768 A 6/1992 Thompson
(Continued)

FOREIGN PATENT DOCUMENTS

WO 2008151377 A1 12/2008

OTHER PUBLICATIONS

ADcooler Adiabatic Cooler and Dcooler Dry-Cooler Catalogue, Euro Chiller International Cooling, believed to be available prior to U.S. Appl. No. 62/456,873, filed Feb. 9, 2017, 16 pages.
(Continued)

*Primary Examiner* — Melvin Jones
(74) *Attorney, Agent, or Firm* — Amsted Industries Incorporated

(57) ABSTRACT

A water recirculation system operates in a primary mode for evaporatively cooling air. When the water recirculation mode malfunctions, the controller switches a secondary once-through mode. The system includes a sump for collecting water run-off from the evaporative pads, and a pump in fluid communication with the sump. The pump transfers moisture from the sump to the distribution arrangement located at the top of the evaporative pads during the recirculation mode. An automatically operated make-up water valve delivers water to a distribution arrangement on the evaporative pads. A moisture distribution arrangement distributes moisture to the evaporative pads and an automatically operated sump drain valve retains water in the sump when closed and freely drains water from the sump when open. A water level control communicates the sump water level to a control system. A monitoring mechanism detects whether the water-recirculation system has malfunctioned or is operating correctly.

26 Claims, 4 Drawing Sheets

(51) Int. Cl.
| | |
|---|---|
| *F28B 9/04* | (2006.01) |
| *F28B 11/00* | (2006.01) |
| *F25B 19/04* | (2006.01) |
| *F28B 5/00* | (2006.01) |
| *F24F 1/0007* | (2019.01) |
| *F24F 11/526* | (2018.01) |
| *F24F 11/61* | (2018.01) |
| *F24F 5/00* | (2006.01) |
| *F24F 11/65* | (2018.01) |
| *F24F 13/22* | (2006.01) |
| *F25B 39/04* | (2006.01) |

(52) U.S. Cl.
CPC .......... *F24F 11/526* (2018.01); *F24F 11/61* (2018.01); *F24F 11/65* (2018.01); *F24F 13/222* (2013.01); *F25B 19/04* (2013.01); *F25B 49/02* (2013.01); *F28B 5/00* (2013.01); *F28B 9/04* (2013.01); *F28B 11/00* (2013.01); *F25B 39/04* (2013.01); *F25B 2339/041* (2013.01)

(58) Field of Classification Search
CPC ....... F28B 11/00; F24F 13/222; F24F 1/0007; F24F 5/0035; F24F 11/65; F24F 11/61
See application file for complete search history.

(56) References Cited

U.S. PATENT DOCUMENTS

| | | | | |
|---|---|---|---|---|
| 5,192,464 A * | 3/1993 | Pawlowski | ........... | F24F 5/0035 261/27 |
| 5,857,350 A * | 1/1999 | Johnson | ................ | F24F 5/0035 62/314 |
| 2003/0029185 A1* | 2/2003 | Kopko | ................... | F24F 3/044 62/271 |
| 2004/0031282 A1* | 2/2004 | Kopko | ................. | F24F 3/1417 62/271 |
| 2005/0012230 A1 | 1/2005 | Kammerzell et al. | | |
| 2010/0162737 A1 | 7/2010 | Hall et al. | | |
| 2011/0079021 A1* | 4/2011 | Maldonado | ............. | F01D 9/041 60/806 |
| 2011/0168362 A1 | 7/2011 | Hall et al. | | |
| 2015/0204626 A1* | 7/2015 | Martell | ................... | F28F 27/00 165/200 |
| 2016/0069577 A1 | 3/2016 | Dinnage | | |

OTHER PUBLICATIONS

Adiabatic Cooling System, Aqua Cooling Incorporating Stadco Cooling, believed to be available prior to U.S. Appl. No. 62/456,873, filed Feb. 9, 2017, 4 pages.
Adiabatic Cooling System (ACS) Installation & Operation Manual, Güntner, dated Mar. 2015, 15 pages.
Hybrid Blue Advanced Dry Cooler Information Manual, Jaeggi Hybridcoolers, dated Aug. 6, 2014, 9 pages.
Güntner ACS—Adiabatic Cooling System, Güntner, dated Sep. 2013, 1 page.
Recold JC Evap Condenser, copyright dated 2017, 2 pages.
Topaz Adiabatic Cooler Brochure, Gohl, dated Jan. 2013, 12 pages.
VB Series Air Cooled Condensers Manual, Bitzer Group of Companies, Buffalo Trident, dated May 2009, 12 pages.
European Search Report in corresponding European Application No. 18155882.6, dated Jun. 21, 2018, 8 pages.
Office action in corresponding Japanese Application No. 2018-021301, dated Mar. 1, 2019, 8 pages.
Second office action in corresponding Japanese Application No. 2018-021301, dated Aug. 16, 2019, 6 pages.
Office Action in corresponding European Application No. 18155882.6, dated Oct. 1, 2019, 4 pages.

* cited by examiner

WATER RECIRCULATION SYSTEM

RELATED APPLICATIONS

This application claims the priority benefit of U.S. provisional patent application No. 62/456,873, filed on Feb. 9, 2017, and titled "WATER RECIRCULATION SYSTEM ON ADIABATIC COOLER/CONDENSER," which is hereby incorporated by reference in its entirety.

TECHNICAL FIELD

This application relates generally to employing liquid recirculation system for an adiabatic cooler (e.g., a condenser). More specifically, this application relates to employing primary evaporative mode and a once-through back-up method for the wetting of adiabatic evaporative material or evaporative pads for applications involving the evaporative cooling of air.

BACKGROUND

Generally, in any cooling arrangement that employs adiabatic material for effecting the evaporative cooling of air, the adiabatic material or evaporative pads are arranged substantially vertical. Moisture, usually water, is deposited on an upper portion of the evaporative pads and by the force of gravity, the moisture gradually descends across the evaporative pads giving the water a chance to be absorbed into the evaporative material. For proper wetting of the evaporative pads, a sufficient amount of moisture is required to saturate the evaporative material in order to achieve the maximum evaporative cooling effect possible that results from forcing air through the saturated evaporative material. As air is forced through the adiabatic material, it is cooled by the action of evaporation. As this occurs, the amount of moisture absorbed into the adiabatic material reduces as the moisture in liquid form is vaporized hence cooling the air passing through the adiabatic material by extracting thermal energy from same in order to vaporize the water. Any water that is not absorbed into the evaporative pads is called run-off and this is primarily pumped back to the top of the evaporative pads to save water.

There are two methods commonly used to deposit water over the top of the evaporative pads. The first method employs a water recirculation system that is designed to pump run-off water from a sump and recirculate it up to the evaporative pads. As water is evaporated, the decreased water level in the sump is sensed and the evaporated water is replaced by adding make-up water to either the sump or directly to the top of the evaporative pads as is known in the art. The amount of make-up water necessary is usually monitored by a sump float switch. The float switch is set to ensure a minimum amount (height) of water exists which is required to maintain a positive head of water pressure to allow proper pump operation.

The second method used to deposit water over the top of the evaporative pads is called a "once-through" system so termed because the water that is deposited to the top of the evaporative pads is not recirculated but it travels only once through the system. In the once-through system, fresh water is deposited to the top of the evaporative pads by energizing a make-up solenoid valve any time the pads are desired to be wetted. In the once-through system, any excess water not absorbed by the pads goes down the drain. While the once-through system is simpler and less expensive in initial cost, it uses more water.

SUMMARY

This application describes liquid distribution systems, and cooling devices or cooling systems that employ liquid distribution systems. In one example, the liquid distribution system includes an inlet configured to allow evaporative liquid into the liquid distribution system. The inlet may, for example, allow liquid to enter from a water source, such as a municipal water supply. The system also includes a dispenser positioned to distribute evaporative liquid over an evaporative pad of the cooling device. The dispenser may include a plurality of dispensing devices (e.g., nozzles, sprayers, or the like), and may be fed from a plurality of different sources, via multiple lines or conduits. A make-up valve regulates the flow of evaporative liquid between the inlet and the dispenser. A sump is positioned to collect evaporative liquid that runs off the evaporative pad, and may include a drain valve and a liquid level monitor. A pump is in fluid communication with the sump and the dispenser, and is configured to force liquid there between (e.g., via a conduit or pipe). A controller, which may include a processor or multiple processors, is in communication with the make-up valve, the pump, and the sump, including the drain valve and the sensors associated with the sump. The controller may be in communication with a variety of other devices and sensors associated with the system.

The controller controls the liquid distribution system to operate among one of a plurality of operating modes, including a recirculation mode and a once-through mode. The primary mode of operation involves closing the make-up valve and operating the pump to distribute evaporative liquid from the sump to the dispenser. The once-through mode of operation involves disabling the pump and opening the make-up valve to allow evaporative liquid to be drawn from the inlet to the dispenser. The controller is configured to select a particular operating based at least in part on monitored parameters of the system, for example, the monitored level of evaporative liquid in the sump, the amount of time that the sump has been filling, and the position of the drain valve of the sump, to name a few examples. The controller may also be configured to control or adjust the positions of valves of the system (e.g., the make-up valve, the drain valve, check valves in line with the pump, etc.), the operation of the pump, and the operation of other equipment of an associated cooling system, such as an air flow generator (e.g., a fan).

BRIEF DESCRIPTION OF THE DRAWINGS

Embodiments of the invention will now be described with reference to the accompanying Figures in which.

DETAILED DESCRIPTION

Figure 1:
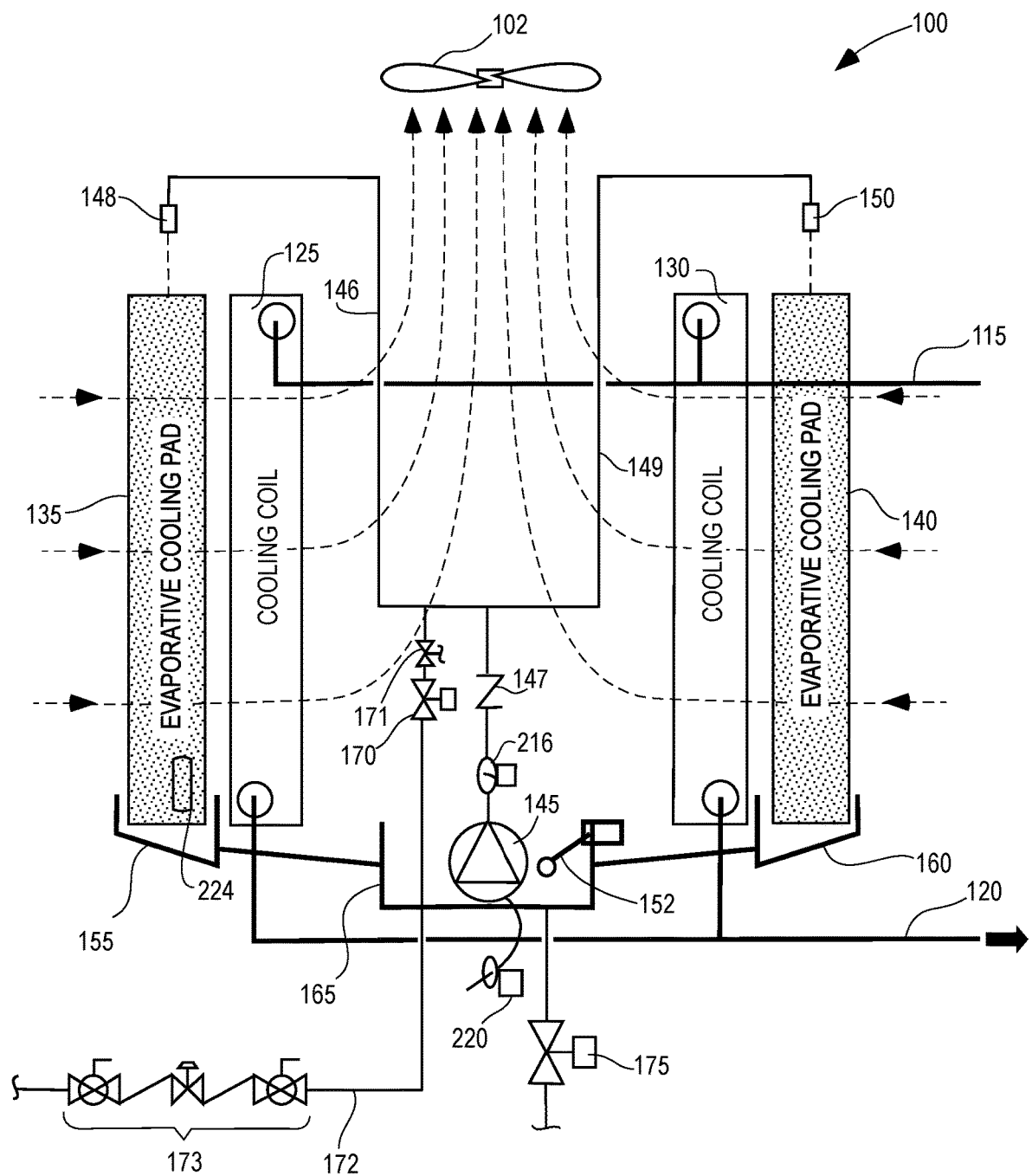
FIG. 1 is a diagrammatic representation of a cooling system incorporating a water recirculation system and a once-through back-up cycle according to a first embodiment of the invention.

This application describes a recirculation system that operates in a primary mode for evaporatively cooling air, and in a secondary/backup mode that operates as a once-through system. The circulation system operates in both a primary mode of operation (called the water recirculation cycle) and in a secondary, or back-up (also called a "once-through") mode of operation. The system may also include and/or operate in connection with a software system that is capable of making decisions for unit operation such that it follows the following logical sequence.

There are advantages to both the primary recirculation and once-through methods of delivering water to the evaporative pads. The described system combines the two methods to be used as desired by introducing a controller or control system that applies control logic to operate the system in whichever mode is desired. The recirculation mode is the primary mode because it saves water and the once-through mode serves as a back-up method to wet the evaporative pads should anything fail on the water recirculation system.

It should be understood that in many embodiments, the evaporative liquid that is recirculated may be water; however, other liquids could also be used. Thus, while the term "water" may be applied in descriptions of certain examples and embodiments, it should be understood that the term could be replaced with the more generic "evaporative liquid" without veering from the scope of the description.

With either the water recirculation or once-through systems, it is difficult to determine the precise amount of liquid that evaporates as the air is cooled, so it is generally accepted that the evaporative material should remain saturated with moisture and be constantly supplied with additional moisture during the evaporative cooling process. As a result, an oversupply of moisture is purposely deposited on an upper portion of the evaporative material, hereafter called evaporative pads, and the excess moisture, generally referred to as run-off, is collected in a trough arrangement disposed beneath the lower portion of the evaporative pads. In the water recirculation system, a sump collects the run-off moisture and a pump extracts the run-off moisture from the sump and re-deposits it onto an upper portion of the evaporative pads generally through a water distribution arrangement. In the once-through system, any excess water not absorbed by the pads goes down the drain.

During operation, the water recirculation system loses water through vaporization as it cools the air forced through the adiabatic material. During the process of vaporization, any sediment or soluble impurities in the water are not vaporized, thus, over time, the concentration of these impurities gradually increases. The impurities in the water may also include microbial impurities that can collect in the sump and promote the growth of bacteria in the sump. In order to reduce the fouling of the sump water, it is common practice to "dump" and "flush" the contents of the sump on a regular basis called the flush mode. It is generally considered an industry practice to dump and flush the sump contents at least once every 12-24 hours of operation. In some cases, a conductivity sensor may be used to initiate the dump cycle as known in the art.

In the water recirculation method, when the water recirculation pump fails or the water recirculation system fails to pump water to the top of the evaporative pads for any reason, the pads dry out and the evaporative pads cannot provide the proper pre-air-cooling needed to satisfy the cooling of the dry heat exchanger(s). When this occurs, customers are left running at higher than desired compressor pressures or system temperatures which causes a loss of capacity, more energy consumption or may also not satisfy the refrigeration loads. Employing a reliable diagnostic system to detect when the water recirculation system has failed to operate properly and employing a once-through back-up system to the water recirculation method without introducing any new hardware is therefore desirable. This described systems combine the once-through and water recirculation methods to save the most amount of water possible while having a back-up system should the water recirculation fail to pump water over the evaporative pads. To reduce hardware and simplify the control logic, the make-up water is fed to the top of the evaporative pads for all embodiments presented.

In some embodiments, there is another attempt to save water when the request-for-wet-operation is no longer needed when the water recirculation pump was previously running. When this condition occurs, the make-up valve is closed and an attempt is made to use any remaining water in the recirculation system before the water recirculation pump operation is terminated and the drain valve is opened.

Thus, some aspects of the described systems provide a primary water-recirculation cycle, a sensing means to detect when the water-recirculation has failed or is not operating satisfactorily, and a once-through back-up cycle for the continued wetting of evaporative pads.

In some aspects, the described systems are configured to send an alarm when the primary mode of water-recirculation cycle has failed to operate correctly. Further, the system may provide a primary water-recirculation cycle, a sensing device that detects when the water-recirculation has failed or is not operating satisfactorily, and a once-through back-up cycle for continued wetting of evaporative pads and to use the same components differently to operate both cycles without requiring additional hardware. Further, the system may be configured to use up all water possible when transitioning from the water pump recirculation cycle to the dry cycle by leaving the water recirculation pump run until the water level reaches a point where the make-up needs to add water.

In one embodiment, a system operates in a primary water-recirculation mode for evaporatively cooling air, and in a secondary once-through mode. The system includes a sump for collecting and storing water run-off from the evaporative pads, and a pump in fluid communication with the sump. The sump transfers moisture from the sump to the distribution arrangement located at the top of the evaporative pads. The system also includes an automatically operated make-up water valve that delivers water to the distribution arrangement located at the top of the evaporative pads. A moisture distribution arrangement distributes moisture to the top of the evaporative pads, and an automatically operated sump drain valve retains water in the sump when closed and freely drains water from the sump when open. The system includes a water level control for communicating the water level in the sump to the controller, and a monitoring mechanism (e.g., a sensor) for detecting the water-recirculation system has failed to operate correctly. The circulation system operates in a primary mode of operation (called the water recirculation cycle) and in a back-up mode of operation (called the once-through cycle). The system may also include and/or operate in connection with a software system that is capable of making decisions for unit operation such that it follows the following logical sequence.

On a call for cooling, that is, a call for the dry coils to cool or condense an internal fluid, the fans pull or push the air through the dry coils turns on. These fans may be adjustable in speed. Upon determining that the fans alone cannot cool the process fluid inside the dry coils, a request for wet operation can be initiated. The decision to initiate wet operation can be decided by many factors such as ambient air temperature, process fluid temperature or pressure, fan speed or a combination of these inputs and is not a limitation of the invention. On a request for wet operation (e.g., when the air entering the cooling coils or any indirect air over heat exchanger needs to be precooled by the evaporative pads to increase the heat rejected by the dry coils), the water recirculation cycle can be initiated. At this point, the make-up valve can open to feed water to the top of the evaporative pads, the drain valve can be closed, and a water fill timer can be initiated. It should be noted that the use of "cooling coil" or "coil" throughout this application may refer to a conduit that is coiled or wound as is customary in cooling systems. However, it should also be understood that such terms may also refer to other techniques for transporting a liquid that is to be cooled or compressed in a cooling system or device. For example, the terms "cooling coil" or "coil" may refer to heat exchanger cassettes, plates, fill, or other modes of operation that are known to be applied in cooling towers or cooling systems.

The control system, or controller, may include a processing device (or multiple processing devices) configured to execute software or other control logic as described herein. The controller communicates with sump float switch, and if the water level read by the float switch is determined to be below a predetermined low set point, the system determines whether the water filler timer has expired. If the timer has not expired, then the pump remains off and the make-up valve remains on. The control system continually checks the sump water level until either the water fill timer expires or until the sump water level reaches a predetermined high level. If the high water level is reached before the water fill timer has expired, then the water recirculation pump is turned on and the make-up is turned off. If the water fill timer has expired before the sump water level reaches the high level, then an alarm is sent to the customer and the once-through back up cycle is initiated (this mode of operation will be discussed below).

Once the water recirculation pump comes on, the control logic determines whether the pumps are running properly, which can be verified directly using a flow switch located in the discharge line of the water recirculation pump or by several other methods. As long as the water recirculation pump is on and water flow has been verified, the system may determine that there are no alarms, and the control system will continue to monitor the water level in the sump so that the make-up valve can be opened should the water level drop due to evaporation of water in the evaporative pads. In some instances, this is the normal and primary mode of operation.

At any time when the water pump is turned on and the water flow switch shows a loss of water flow, such as with a pump failure, the system can enable an alarm and initiate the once-through back-up cycle. The once-through back up cycle turns off the pump, opens the sump drain valve, opens the make-up valve and sends an alarm to the customer. In this mode, the control system pre-cools the air from the evaporative pads by depositing make-up water to the evaporative pads and any run-off water exits the sump drain valve (and therefore is not recirculated). At this point, a once-through-check-timer can be initiated to keep the system in the once-through back-up cycle for a predetermined but adjustable period. Once the once-through-check-timer has expired, the control logic will attempt to return the unit to normal water recirculation operation and check for proper component function. The reason for this function is to determine if the initial fault that prompted the once-through mode has since been corrected (for example some debris that caused a fault has been cleared, a failed component has been replaced or the water has been restored and a technician did not manually reset the system). In this way, the building owner will have the confidence that the system will automatically go back to the water savings mode of operation if the issue causing the problem has been repaired.

In another embodiment, a system includes a sump for collecting and storing water run-off from the evaporative pads, and a pump in fluid communication with the sump. The pump transfers moisture from the sump to a first distribution arrangement located at the top of the evaporative pads. The system also includes an automatically operated make-up water valve which delivers water to a second distribution arrangement located at the top of the evaporative pads. First and second moisture distribution arrangements distribute moisture to the top of the evaporative pads. An automatically operated sump drain valve which retains water in the sump when closed and freely drains water from the sump when open. The system includes a water level control for communicating the water level in the sump to the control system, and a detector or sensor for detecting whether the water-recirculation system has failed to operate correctly. The system includes a processing device that operates software system capable of making decisions for unit operation.

There are at least three embodiments that utilize the sensing of proper operation of the water recirculation system and automatic transfer to the once-through back-up control system logic. In the first embodiment, the make-up water is introduced into the same discharge conduit leaving the water recirculation pump. A check valve is located between the make-up water entry point and the pump outlet to prevent make-up water from draining backwards through the pump. In the second and third embodiments, the make-up water is delivered to a separate delivery point at the top of the evaporative pads thus eliminating the need for the check valve. All three techniques employ the water recirculation system as the primary means to provide water to the top of the evaporative pads and employ a monitoring control system which detects when the water recirculation system has malfunctioned and a control system that switches from the water recirculation cycle to the once-through cycle until service is performed and the control logic alarm is reset.

While a water flow switch can be directly used to prove the water recirculation pump is working, there are alternative methods to determine if the pump or water recirculation system is properly working. These alternative methods include a water flow switch, water flow sensor, water distribution basin level switch or sensor, current or KW switch, current sensor, conductivity sensor, pressure or differential pressure switch, temperature sensors before/after the evaporative pads, and evaporative pad wetness sensors. Any of these sensors or a combination of these sensors may be employed to detect proper operation of the water recirculation system and is not a limitation of the invention.

Turning now to the Figures, FIG. 1 shows a cooling system 100 where a fluid to be cooled or condensed is passed internally through conduits including cooling coils 125, 130 through conduit 115. The internal fluid to be cooled or condensed may be water or a water/glycol mixture or any refrigerant that needs to be cooled or condensed. Cooling coils 125 and 130 may be tubes with fins or microchannel design. As noted above, cooling coils 125 and 130 may be a condenser or any indirect heat exchanger which has air passing across it to reject heat to the atmosphere. As the fluid passes through the cooling coils 125, 130 thermal energy is extracted and the cooled fluid is emitted from the bottom of the cooling coils (125, 130) and returned through conduit 120. The fluid directions may be revered if desired. Cooling system 100 extracts thermal energy from the cooling fluid by passing ambient air over the coils 125 and 130 by way of an airflow generating device, such as a fan 102. During periods where the ambient air temperature is sufficiently low or when the load is sufficiently low, air can be drawn through the "dry" evaporative pads 135 and 140 then across cooling coils 125 and 130 via the fan 102 (or other airflow generating device) without the operation of a water recirculation system. Such a method of operation is considered to be operating in a "dry" mode.

In the event that the ambient air temperature is not sufficiently low, or where an increased heat exchange capacity is desired, cooling system 100 can transition from the "dry" mode to a "wet" mode of operation by applying of moisture in the form of an evaporative liquid (e.g., water) to the evaporative cooling pads 135 and 140. When evaporative cooling pads 135 and 140 are wet, they evaporatively cool the air which then passes colder incoming air through cooling coils (125, 130). This increases the amount of heat that can be withdrawn from cooling coils 125 and 130.

Cooling system 100, as well as other embodiments contemplated herein, employ two modes of wet operation. The first, or primary wet mode is considered a water recirculation cycle. The second, or back-up wet mode is considered a once-through cycle. The primary wet mode operates in the water recirculation mode because it conserves evaporative liquid compared to the once-through mode. Thus, under standard operating conditions, this liquid conserving mode is typically sufficient to accomplish the cooling demands. The cooling system 100 is configured to switch into a once-through cycle as a back-up, for example, if the water recirculation mode fails to properly operate. The cooling system 100 switches modes of operation so without introducing any new components.

When transitioning cooling system 100 from the dry to the wet mode, a make-up solenoid valve 170 is activated or opened and the water dump valve 175 is closed. The flow rate from the make-up valve 170 is typically controlled by flow control valve 171 which may be an orifice, pressure regulator or throttle valve. By applying the make-up water to the top of evaporative pads 135 and 140, evaporative pads can be wetted without activating the water recirculation pump 145. In order to ensure that evaporative cooling pads 135 and 140 are sufficiently saturated, a sufficient amount of evaporative liquid is provided to the distribution arrangements 148 and 150 such that the liquid trickles down through the evaporative cooling pads 135 and 140 and runs-off the cooling pads into the respective optional collecting troughs 155 and 160. Optional collecting troughs 155 and 160 act as a temporary and intermediate collection of run-off liquid which is then provided through conduits to the sump 165. In another arrangement, a larger sump may be used and optional troughs 155 and 160 do not exist.

Sump 165 collects the run-off liquid from collecting troughs 155 and 160. Upon collecting enough run-off water to provide a sufficient head of pressure to the intake of water recirculation pump 145 (sensed by a level sensor, e.g., a float switch 152 detecting that the level of the evaporative liquid is high enough to safely bring on pump 145), pump 145 is activated to recirculate liquid from sump 165 through conduits 146 and 149 to the dispensers, or liquid distribution arrangements 148 and 150.

As float switch 152 senses that the evaporative liquid level is high enough to safely bring on pump 145, make-up valve 170 is deactivated or closed. The recirculated external make-up liquid then trickles down through the adiabatic material of the evaporative cooling pads 135 and 140 and is absorbed by the evaporative pads. As ambient air passes through the evaporative pads 135 and 140, the air is cooled by the action of evaporation as the liquid that was initially absorbed by the adiabatic material is then vaporized and converted from liquid to gaseous form.

Since the make-up valve 170 and recirculation water pump 145 communicate with the same conduits, a back pressure flow prevention device, or check valve 147 is used to inhibit make-up liquid from going backwards down through the pump. Likewise, backflow prevention valve network 173 inhibits recirculated liquid from back-flowing into other make-up liquid sources, which may be, for instance as a city water supply.

During the primary recirculation mode, as liquid is depleted from the evaporative air cooling system, the liquid level in sump 165 decreases. When the level is sufficiently low, as sensed by float switch 152, make-up valve 170 opens to introduce replacement make-up water into the system 100 and a make-up timer is started. Once the liquid level in sump 165 rises to a high predetermined level, make-up valve 170 is closed, thereby shutting off the make-up liquid source. If the water level does not rise and the make-up timer expires, the system 100 generates an alarm and the once-through back-up cycle (as discussed in more detail below) is initiated.

A control system continually monitors the operation of the pump 145 and the make-up valve 170 to ensure properly cycling on and off according to the signal from the sump float switch 152. If the control system detects an issue that says that there is a problem with the water recirculation system, the wet mode is transferred to the once-through back-up cycle. The conditions that may be continually monitored include: the water level (e.g., determining whether the water level is insufficient to keep the pump running as determined by float switch 152), the water make-up timer, pump flow switch 216, pump electrical detection switch 220 or sensor, water pad sensor 224 (e.g., determining whether the sensor detects that the evaporative pads are not wet) or a combination of the methods or even other optional methods.

If the water make-up timer times out and the water level has not been made, then the control changes from the water recirculation cycle to the once-through back-up cycle. There are many reasons the make-up valve may fail to bring the water level up in sump 165 including but not limited to a defective make-up valve 170, clogged water flow control 171, a broken pipe, float switch 152 is dirty and stuck in the down position, or drain valve 175 failed to close or is defective. In any of these cases, there is not sufficient water in sump 165 to keep the pump running, thus the wet mode is changed from the water recirculation mode to the once-through mode. In addition to the water make-up timer, any of the water recirculation sensing methods which detect a failure will also change the wet mode from water recirculation mode to the once-through back up cycle.

When transitioning the cooling system 100 from the wet water recirculation mode to the once-through wet back-up cycle, the make-up valve 170 is energized, recirculation pump 145 is turned off, sump water dump valve 175 is opened and an alarm is sent to the customer so that a service technician is called to correct whatever may be wrong with the water recirculation system. The logic that the cooling system 100 follows is represented by the diagram detailed in FIG. 5.

Cooling system 100 in FIG. 1 also employs a "dump cycle" as known in the art such that after a predetermined period of time, which is approximately 12-24 hours pump recirculation mode, pump 145 is turned off and sump drain valve 175 is opened to release the entire contents of the sump 165 to reduce the likelihood of the generation and growth of bacteria and slime in the sump 165.

Figure 2:
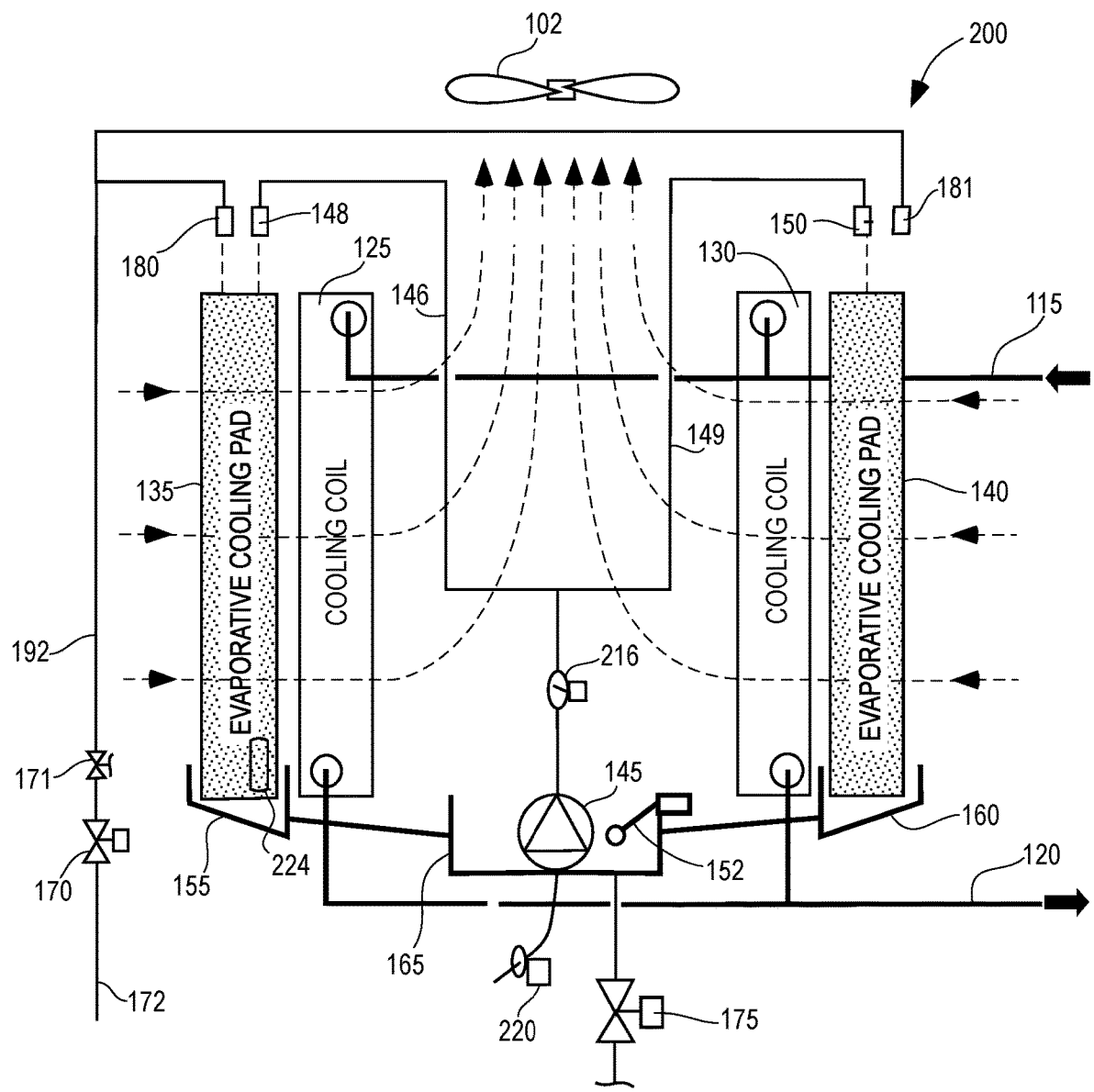
FIG. 2 is a diagrammatic representation of cooling system incorporating a water recirculation system and a once-through back-up cycle according to a second embodiment of the invention.

FIG. 2 shows a cooling system 200 where a fluid to be cooled or condensed (e.g. water or refrigerant) is passed internally through cooling coils 125, 130 through conduit 115. Many components operates similar to, or the same as the corresponding components identified above with respect to FIG. 1, though there are exceptions. In the cooling system 200, make-up valve 170 still delivers liquid to the top of evaporative pads 135 and 140. But here, the liquid it is delivered through a separate conduit 192 that delivers fresh make-up water to water distribution arrangements 180 and 181. Separating the deliveries from pump 145 into separate lines 148 and 150, and the lines 180 and 181 from the make-up valve 170 allows the system 100 to operate without the check valve 147 (shown in FIG. 1). This also alleviates there is no need to employ a back-flow preventer valve network 173 (shown in FIG. 1).

Figure 3:
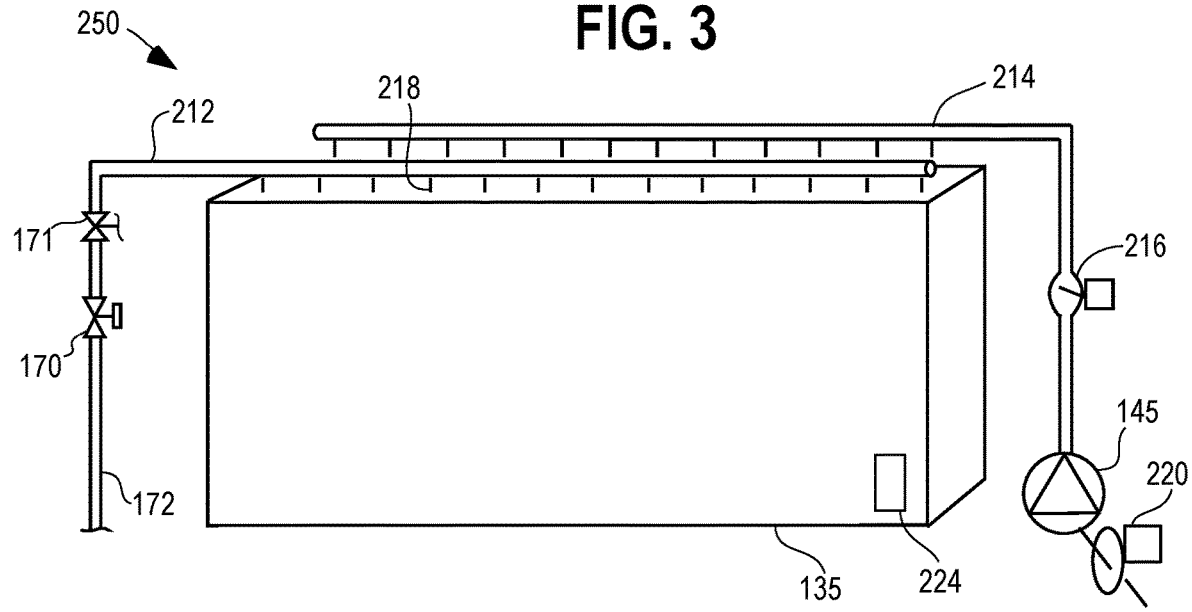
FIG. 3 is a side view representation of the cooling system of FIG. 2 providing a side view of an embodiment with a dual pipe feed arrangement.

FIG. 3 shows a portion of a cooling system 250 with evaporative pads 135 from a side view. In this view, a separate delivery system is shown as individual pipes 212 from make-up valve 170 and a water delivery pipe 214, which is fed from water recirculation pump 145. Individual water delivery pipes 212 and 214 can have orifices, nozzles or holes drilled in them, which delivers water droplets 218 to the top of evaporative pad 135. Further water delivery pipes 212 and 214 can be adjacent to one another or can be positioned one over top of the other depending on the room allowed.

Figure 4:
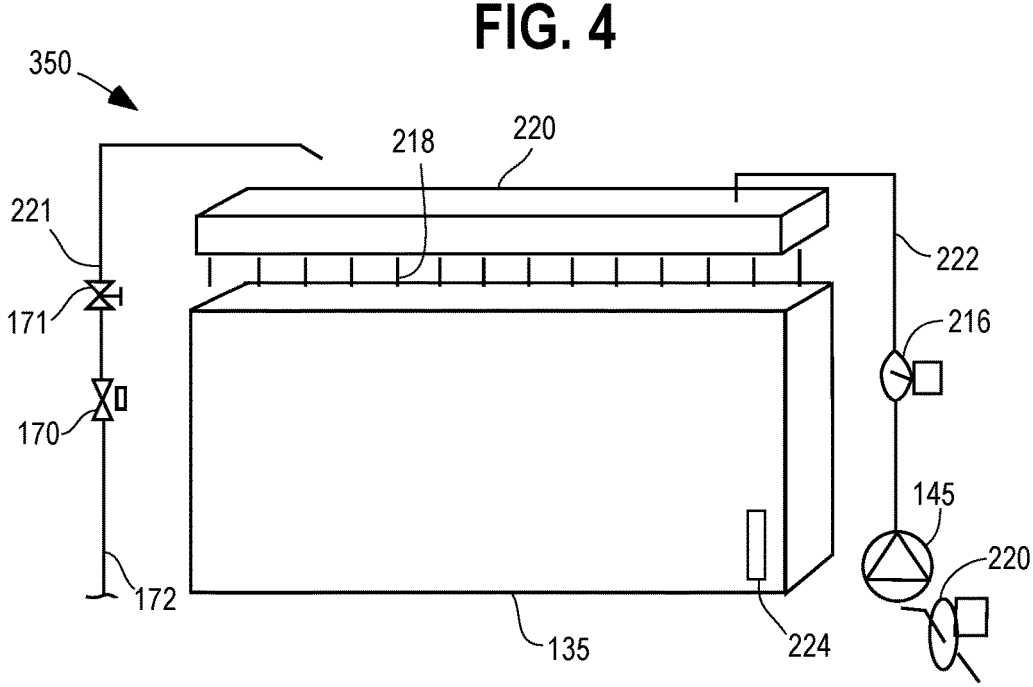
FIG. 4 is a side view representation of the cooling system of FIG. 2 providing a side view of an embodiment with a water basin feed arrangement.

FIG. 4 also shows a portion of a cooling system 350 with evaporative pads 135 from a side view. In this view, a separate delivery pipe 221 from make-up valve 170 and a water delivery pipe 222 from recirculation pump 145 drop into gravity water feed basin 220. Gravity feed water basin 220 may have orifices, nozzles or holes to deliver water droplets 218 to the top of evaporative pads 135. Pipe 221 may have a higher point of entry with regard to pipe 222 and also may need to be above gravity feed water basin 220 as required by some municipalities to prevent recirculated water to enter the city water system.

Figure 5:
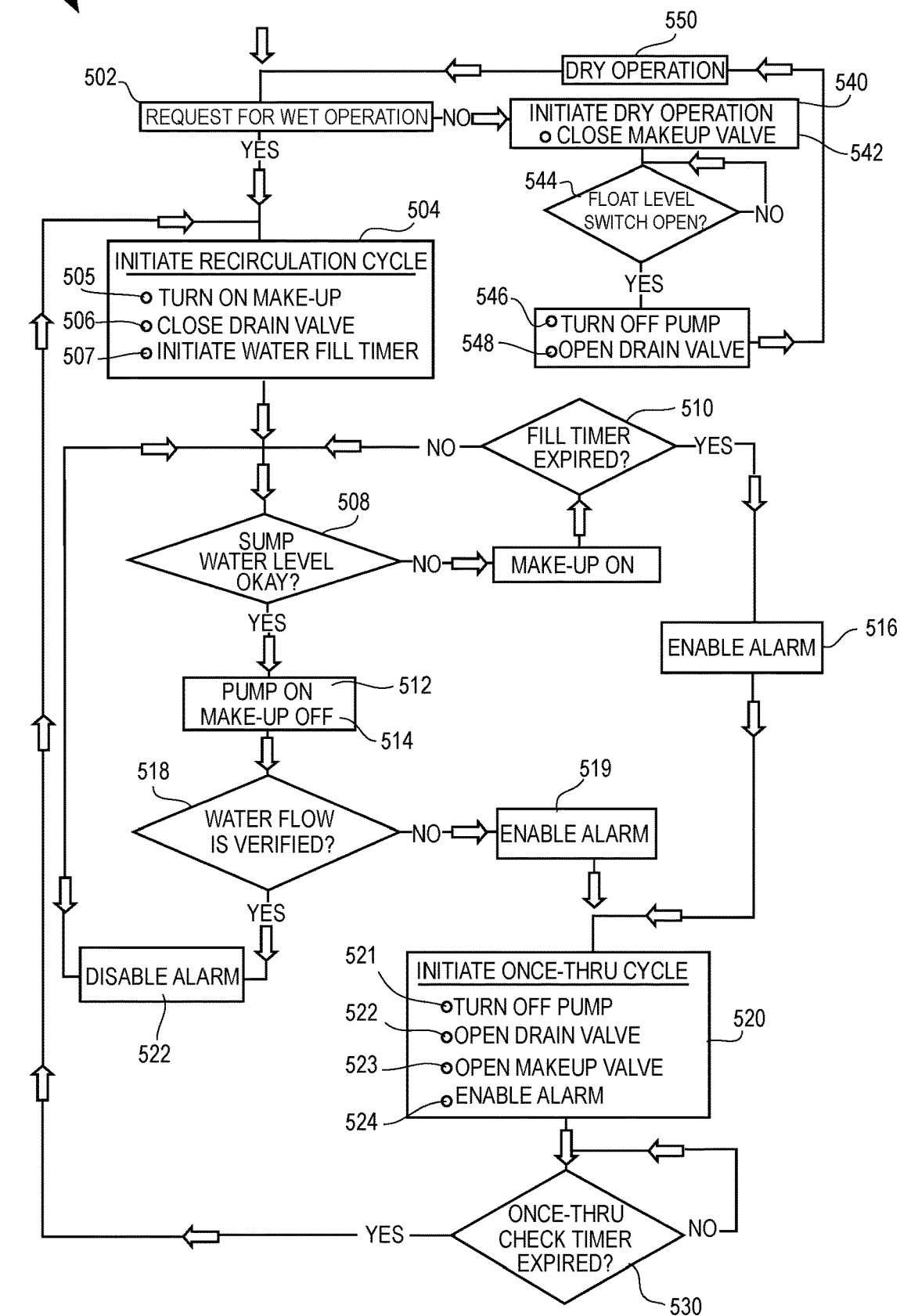
FIG. 5 is a flow diagram of program logic to determine when to switch modes of operation according to all embodiments of the invention.

FIG. 5 is a flow diagram 500 for a control logic sequence that can be applied by the various examples of cooling systems described herein. It should be noted that there are multiple ways to control the fan speed with both wet and dry evaporative pads as known in the art and that the logic in FIG. 5 starts with a request for wetting the evaporative pads. The decision to require wet operation is well known in the art and can be decided by many factors such as ambient air temperature, process fluid temperature, process fluid pressure, a maximum preset fan speed or a combination of these inputs and is not a limitation of the invention.

Referring now to FIG. 5, on a request for wet operation 502, that is when the air entering cooling coils needs to be precooled by the evaporative pads and to increase the heat rejected by the system, the water recirculation cycle 504 is initiated. At this point, make-up valve 505 opens to feed water to the top of evaporative pads, water sump drain valve 506 is closed, and a water fill timer 507 is initiated. The control system looks at sump float switch 508 and if the water level is below a predetermined low set point, it checks to see of the water fill timer 510 has expired. If the water fill timer 510 has not expired, then recirculation pump 512 remains off and the make-up valve 514 remains on. The control system 500 continually checks the sump water level 508 until either the water fill timer 510 expires or until sump water level 508 reaches a predetermined high level. If the high water level is reached before the water fill timer 510 has expired, then water recirculation pump 512 is turned on and make-up 514 is turned off. If the water fill timer 510 has expired before sump water level 508 reaches the high level, then an alarm 516 is sent to the customer and the once-through back up cycle 520 is initiated (this mode of operation will be discussed below).

Once water recirculation pump 512 comes on, the control logic checks to see if it appears to be running properly. Proper recirculation pump operation 518 can be verified 518 directly via water flow switch located in the discharge line of water recirculation pump, by pump electrical detection switch or sensor, water pad sensor or other methods described herein. As long as water recirculation pump 512 is on and water flow 518 has been verified, there will be no alarms 519 and the control system 500 will continue to monitor the water level 508 in the sump so that make-up valve 514 can be opened should the water level drop due to evaporation of water in the evaporative pads. This is the normal and primary mode of operation.

At any time when recirculation water pump 512 is turned on and water flow switch 518 shows a loss of water flow, such as with a pump failure, an alarm 519 is enabled and the once-through back-up cycle 520 is initiated. The once-through back up cycle turns off water recirculation pump 521, opens sump drain valve 522, opens make-up valve 523, and sends an alarm 524 to the customer. Now the control system is pre-cooling the air from the evaporative pads by depositing make-up water to the evaporative pads and any run-off water exits the sump drain valve 522. At this point, a once-through check timer 530 is initiated which keeps the system in the once-through back-up cycle for a predetermined but adjustable period. Once the once-through check timer 530 has expired, the control logic 500 will attempt to run water recirculation pump and check for proper operation by initiating 504 the water recirculation mode again.

Referring again, to FIG. 5, once the request for wet operation 502 is turned off, and if water recirculation pump was previously running, then the dry operation 540 is initiated and make-up valve 542 is closed, and an attempt is made to use any remaining water in the recirculation system before the water recirculation pump is turned off. The control logic thus looks at sump water level 544 and continues to run water recirculation pump until sump level switch 544 indicates the water level has dropped. Once sump water level switch 544 indicates the water level has dropped, water recirculation pump 546 is turned off and water dump valve 548 is opened. Using this logic uses as much of the recirculation water possible before dumping the remaining water when returning back to the dry mode of operation 550.

In this way, the method 500 of operating a liquid dispensing system involves dispensing liquid over an evaporative pad with a dispenser, collecting run-off liquid from the evaporative pad in a sump, and monitoring parameters associated with the level of liquid within the sump. The method also involves controlling the mode of operation between a recirculation mode and a once-through mode with the controller based at least in part on the monitored parameters. For instance, the monitored parameters can include the level of evaporative liquid within the sump, the operating capabilities and/or efficiencies of the pump, the drain valve position of the sump, the amount of time that the system has been operating in a once-through mode versus a recirculation mode, among other parameters. When operating in the recirculation mode, the controller causes the system to deliver evaporative liquid from the sump to the dispenser. When operating in the once-through mode, the controller causes the system to deliver liquid from an inlet to the dispenser.

This application describes examples of water recirculation systems that should be interpreted to be illustrative and not limiting. Those skilled in the art will recognize that the described examples could be modified and/or combined with one another without departing from the scope described herein. Further, features of one embodiment or example may be combined with features of other embodiments or examples to provide still further embodiments or examples as desired. All references that this application cites, discusses, identifies, or refers to are hereby incorporated by reference in their entirety.

The invention claimed is:

1. A liquid distribution system for a cooling device system comprising:
   an inlet configured to allow evaporative liquid into the liquid distribution system;
   a dispenser positioned to distribute evaporative liquid over an evaporative pad of the cooling system;
   a make-up valve that regulates the flow of evaporative liquid between the inlet and the dispenser;
   a sump positioned to collect evaporative liquid that runs off the evaporative pad, the sump including a drain valve and a level sensor;
   a pump in fluid communication with the sump and the dispenser; and
   a controller in communication with the make-up valve, the drain valve, the level sensor, and the pump,
   wherein the controller is configured to control the liquid distribution system to operate among one of a plurality of operating modes, the plurality of operating modes including a recirculation mode and a once-through mode,
   wherein the recirculation mode of operation involves operating the make-up valve to maintain a sufficient water level in the sump and operating the pump to distribute evaporative liquid from the sump to the dispenser,
   wherein the once-through mode of operation involves disabling the pump and opening the make-up valve to allow evaporative liquid to be drawn from the inlet to the dispenser,
   wherein the controller is configured to monitor the level of evaporative liquid in the sump via the level sensor, and
   wherein the controller is configured to select a particular operating mode among the plurality of operating modes based at least in part the monitored level of evaporative liquid in the sump.

2. The liquid distribution system of claim 1 wherein the controller, in the water recirculation mode of operation, is configured to close the drain valve of the sump and operate a fill timer.

3. The liquid distribution system of claim 2, wherein the controller is configured to switch operating modes from the recirculation to the once-through mode where the level of evaporative liquid in the sump does not meet a predetermined level.

4. The liquid distribution system of claim 3, wherein the controller is configured to operate an alarm where the fill timer indicates that a predetermined amount of time has elapsed and the level of evaporative liquid in the sump has not reached the predetermined level.

5. The liquid distribution system of claim 1 wherein the controller is configured to switch from the recirculation mode back to a dry mode, wherein the controller, while operating in the dry mode, is configured to effect operation of the pump until the monitored level of evaporative fluid within the sump has reaches a predetermined level.

6. The liquid distribution system of claim 1, wherein the controller is configured to enable an alarm and start a once-through check timer in response to switching to the once-through mode, and wherein the controller is configured to automatically attempt to run the recirculation mode in response to the once-through check timer expires.

7. The liquid distribution system of claim 1, further comprising an operation monitor configured to monitor operation of the pump.

8. The liquid distribution system of claim 7, wherein the operation monitor comprises a flow switch in a discharge line of the pump.

9. The liquid distribution system of claim 7, wherein the controller is configured to operate an alarm and execute operation of the once-through mode of operation in response to the operation monitor detecting that the pump is not operating properly.

10. The liquid distribution system of claim 1, wherein the dispenser is in fluid connection with the sump and the inlet, and further comprising a check valve in line between the pump and the dispenser.

11. The liquid distribution system of claim 1, wherein the dispenser includes a first dispenser in fluid communication with the pump and with the inlet and a second dispenser in fluid communication with the make-up valve and the inlet.

12. The liquid distribution system of claim 11, wherein a conduit establishing fluid communication between the pump and the first dispenser is without a check valve.

13. A cooling system comprising:
   a cooling coil configured to pass an internal fluid;
   an evaporative pad positioned relative to a cooling coil;
   an airflow generator arranged to draw air through the evaporative pad and over the cooling coil; and
   a liquid distribution system comprising:
      an inlet configured to allow evaporative liquid into the liquid distribution system;
      a dispenser positioned to distribute evaporative liquid over the evaporative pad;
      a make-up valve that regulates the flow of evaporative liquid between the inlet and the dispenser;
      a sump positioned to collect evaporative liquid that runs off the evaporative pad, the sump including a drain valve and a level sensor,
      a pump in fluid communication with the sump and the dispenser; and
   a controller in communication with the airflow generator, the drain valve, the level sensor, and the liquid distribution system,
      wherein the controller is configured to control the liquid distribution system to operate among one of a plurality of operating modes, the plurality of operating modes including a recirculation mode and a onMilesce-through mode, wherein the recirculation mode of operation involves operating the make-up valve to maintain a sufficient water level in the sump and operating the pump to distribute evaporative liquid from the sump to the dispenser, wherein the once-through mode of operation involves disabling the pump and opening the make-up valve to allow evaporative liquid to be drawn from the inlet to the dispenser, wherein the controller is configured to monitor the level of evaporative liquid in the sump via the level sensor, and wherein the controller is configured to select a particular operating mode among the plurality of operating modes based at least in part the monitored level of evaporative liquid in the sump.

14. The cooling system of claim 13, wherein the controller, in the water recirculation mode of operation, is configured to close the drain valve of the sump and operate a fill timer.

15. The cooling system of claim 14, wherein the controller is configured to switch operating modes from the recirculation mode to the once through mode where the level of evaporative liquid in the sump does not meet a predetermined level.

16. The cooling system of claim 15, wherein the controller is configured to operate an alarm where the fill timer indicates that a predetermined amount of time has elapsed and the level of evaporative liquid in the sump has not reached the predetermined level.

17. The cooling system of claim 13, wherein the controller is configured to switch from the water recirculation mode back to a dry mode, wherein the controller, while operating in the dry mode, is configured to effect operation of the pump until the monitored level of evaporative fluid within the sump has reaches a predetermined level.

18. The cooling system of claim 13, wherein the controller is configured to enable an alarm and start a once-through check timer in response to switching to the once-through mode, and wherein the controller is configured to automatically attempt to run the water recirculation mode in response to the once-through check timer expires.

19. The cooling system of claim 13, further comprising an operation monitor configured to monitor operation of the pump.

20. The cooling system of claim 19, wherein the controller is configured to operate an alarm and execute operation of the once-through mode of operation in response to the operation monitor detecting that the pump is not operating properly.

21. The liquid distribution system of claim 13, wherein the dispenser is in fluid connection with the sump and the inlet, and further comprising a check valve in line between the pump and the dispenser.

22. The liquid distribution system of claim 13, wherein the dispenser includes a first dispenser in fluid communication with the pump- and with the inlet and a second dispenser in fluid communication with the make-up valve and the inlet.

23. The liquid distribution system of claim 22, wherein a conduit establishing fluid communication between the pump and the first dispenser is without a check valve.

24. The liquid distribution system of claim 13, wherein when the controller switches from the water recirculation mode back to the dry mode, the water recirculation pump remains on until the sump water level reaches a predetermined level.

25. The liquid distribution system of claim 13, wherein when the controller switches to the once-through mode it enables an alarm and starts a once through check timer and when this timer expires, the controller will automatically attempt to run the water recirculation mode.

26. A method of operating a liquid dispensing system between a recirculation mode and a once-through mode, the method comprising:

dispensing liquid over an evaporative pad with a dispenser;

collecting run-off liquid from the evaporative pad in a sump; and monitoring parameters associated with the level of liquid within the sump; and controlling the mode of operation between a recirculation mode and a once-through mode with the controller based at least in part on the monitored parameters, wherein operating in the recirculation mode involves delivering liquid from the sump to the dispenser, wherein operating in the once-through mode involves delivering liquid from an inlet to the dispenser, wherein the monitoring parameters includes monitoring the level of evaporative liquid in the pump via a level sensor, and wherein the controlling the mode of operation includes selecting one of the recirculation mode and the once-through mode based at least in part the monitored level of evaporative liquid in the sump.

* * * * *